(12) United States Patent
Liu et al.

(10) Patent No.: US 10,732,599 B2
(45) Date of Patent: Aug. 4, 2020

(54) POWER SAVING SYSTEM AND POWER SAVING METHOD FOR INTELLIGENT ROBOT

(71) Applicant: AROBOT INNOVATION CO., LTD., New Taipei (TW)

(72) Inventors: Wen-Ping Liu, New Taipei (TW); Yung-Hsing Yin, New Taipei (TW); Chi-Hao Kao, New Taipei (TW); Po-Chun Yen, Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 343 days.

(21) Appl. No.: 15/888,137

(22) Filed: Feb. 5, 2018

(65) Prior Publication Data

US 2019/0146440 A1    May 16, 2019

(30) Foreign Application Priority Data

Nov. 10, 2017    (TW) .............................. 106139000 A

(51) Int. Cl.
*H02J 7/00* (2006.01)
*G05B 19/048* (2006.01)
*B25J 9/16* (2006.01)
*B25J 19/02* (2006.01)
(Continued)

(52) U.S. Cl.
CPC ............ *G05B 19/048* (2013.01); *B25J 9/161* (2013.01); *B25J 19/005* (2013.01); *B25J 19/021* (2013.01);
(Continued)

(58) Field of Classification Search
CPC .... G06F 1/3203; G06F 1/3212; G06F 1/3287; B25J 19/005; B25J 19/021; B25J 19/026;
(Continued)

(56) References Cited

U.S. PATENT DOCUMENTS

2008/0309277 A1* 12/2008 Sugino ................... B25J 19/005
318/600
2010/0030417 A1*  2/2010 Fang ...................... G05D 1/0274
701/25
(Continued)

FOREIGN PATENT DOCUMENTS

CN    103718618 A    4/2014
CN    105630129 A    6/2016
(Continued)

*Primary Examiner* — Dale Moyer
(74) *Attorney, Agent, or Firm* — Li & Cai Intellectual Property (USA) Office

(57) ABSTRACT

Disclosed is a power saving system and power saving method for an intelligent robot, including a central processing unit, a first device group and a second device group. When a voltage level of the battery is changed to a second voltage level from the first voltage level, the central processing unit controls the first device group to stop receiving energy from the battery. When the voltage level of the battery is changed to a third voltage level from the second voltage level, the central processing unit controls the second device group to stop receiving energy from the battery. When the voltage level of the battery is changed to a voltage threshold value from the third voltage level, the central processing unit controls the intelligent robot to stop receiving energy from the battery.

14 Claims, 6 Drawing Sheets

(51) Int. Cl.
*B25J 19/00* (2006.01)
*G05B 19/042* (2006.01)
(52) U.S. Cl.
CPC .......... *B25J 19/026* (2013.01); *G05B 19/042* (2013.01); *H02J 7/0063* (2013.01); *G05B 2219/2639* (2013.01)
(58) Field of Classification Search
CPC ...... B25J 9/161; G05B 19/042; G05B 19/048; G05B 2219/2639; G05B 2219/25289; H02J 2007/0067; H02J 7/0063; G09G 2330/021; Y10S 901/01

See application file for complete search history.

(56) References Cited

U.S. PATENT DOCUMENTS

| | | | |
|---|---|---|---|
| 2010/0234998 | A1 | 9/2010 | Kim |
| 2015/0311737 | A1* | 10/2015 | Park ..................... H02J 7/0063 307/125 |
| 2015/0375395 | A1* | 12/2015 | Kwon ..................... H02J 50/10 700/245 |
| 2017/0135543 | A1 | 5/2017 | Halloran et al. |
| 2017/0285722 | A1* | 10/2017 | Kim ..................... G06F 1/3296 |

FOREIGN PATENT DOCUMENTS

| | | |
|---|---|---|
| CN | 105723635 A | 6/2016 |
| CN | 106712135 A | 5/2017 |
| TW | M350028 U | 2/2009 |
| TW | 201101019 A1 | 1/2011 |

\* cited by examiner

POWER SAVING SYSTEM AND POWER SAVING METHOD FOR INTELLIGENT ROBOT

BACKGROUND OF THE INVENTION

1. Field of the Invention

The instant disclosure relates to a power saving system, and in particular, to a power saving system and power saving method for an intelligent robot.

2. Description of Related Art

With the development of technology, robots have replaced the need for manual labor in work requiring hard labor, for example, using mechanical arms for heavy lifting or complicated processes. In recent years, domestic robots have been widely accepted by people, and may be used for domestic cleaning and human-robot interaction. However, the circuitry design of robots generally involves heavy power consumption, which results in low electricity storage efficiency of the robot.

SUMMARY OF THE INVENTION

The instant disclosure provides a power saving system for an intelligent robot. The power saving system includes a battery. The battery charges the intelligent robot at a first voltage level. The power saving system includes a central processing unit, a first device group and a second device group. The first device group is electrically connected to the central processing unit. When a voltage level of the battery is changed to a second voltage level from the first voltage level, the central processing unit controls the first device group to stop receiving energy from the battery. The first voltage level being than the second voltage level. The second device group is electrically connected to the central processing unit. When the voltage level of the battery is changed to a third voltage level from the second voltage level, the central processing unit controls the second device group to stop receiving energy from the battery. The second voltage level being than the third voltage level. When the voltage level of the battery is changed to a voltage threshold value from the third voltage level, the central processing unit controls the intelligent robot to stop receiving energy from the battery.

The instant disclosure further provides a power saving method for an intelligent robot. The intelligent robot includes a battery, a central processing unit, a first device group, a second device group and the central processing unit. The central processing unit is electrically connected to the battery, the first device group and the second device group. The battery charges the intelligent robot at a first voltage level. The power saving method includes: controlling the first device group to stop receiving energy from the battery when a voltage level of the battery is changed to a second voltage level from the first voltage level, the first voltage level being higher than the second voltage level; controlling the second device group to stop receiving energy from the battery when the voltage level of the battery is changed to a third voltage level from the second voltage level, the second voltage level being higher than the third voltage level. When the voltage level of the battery is changed to a voltage threshold value from the third voltage level, the central processing unit controls the intelligent robot to stop receiving energy from the battery.

For further understanding of the instant disclosure, reference is made to the following detailed description illustrating the embodiments of the instant disclosure. The description is only for illustrating the instant disclosure, and should not be construed as limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
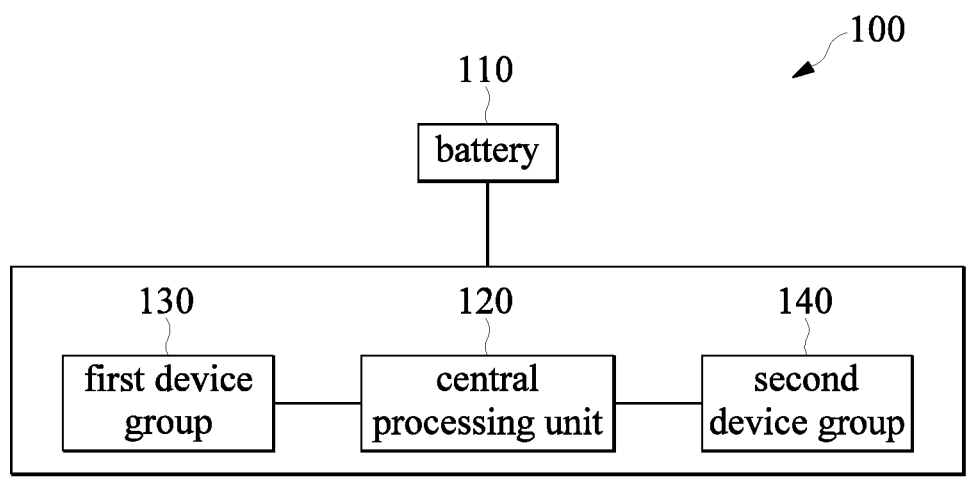
FIG. 1 shows a block diagram of a power saving system for an intelligent robot according to one embodiment of the instant disclosure.

Reference is made to FIG. 1. FIG. 1 shows a block diagram of a power saving system for an intelligent robot according to one embodiment of the instant disclosure. The power saving system 1 includes a battery 110, which may be, a lead storage battery. The battery 110 charges other electronic components of the intelligent robot 100 at a first voltage level. The power saving system 1 includes a central processing unit 120, a first device group 130 and a second device group 140. The first device group 130 is electrically connected to the central processing unit 120. When a voltage level of the battery 100 is changed to a second voltage level from the first voltage level, the central processing unit 120 controls the first device group 130 to stop receiving energy from the battery 110. The first voltage level beingthan the second voltage level. For example, the first voltage level may be 16.8 voltage (V), and the second voltage level may be 15.4 V. The second device group 140 is electrically connected to the central processing unit 120. When the voltage level of the battery 110 is changed to a third voltage level from the second voltage level, the central processing unit 120 controls the second device group 140 to stop receiving energy form the battery 110. The second voltage level is higher than the third voltage level. For example, the third voltage level may be 14.2 V. When the voltage level of the battery 110 is changed to a voltage threshold value (e.g., 12 V) from the third voltage level, the central processing unit 120 controls the other electrical components of the intelligent robot 100 to stop receiving energy from the battery 110.

Figure 2:
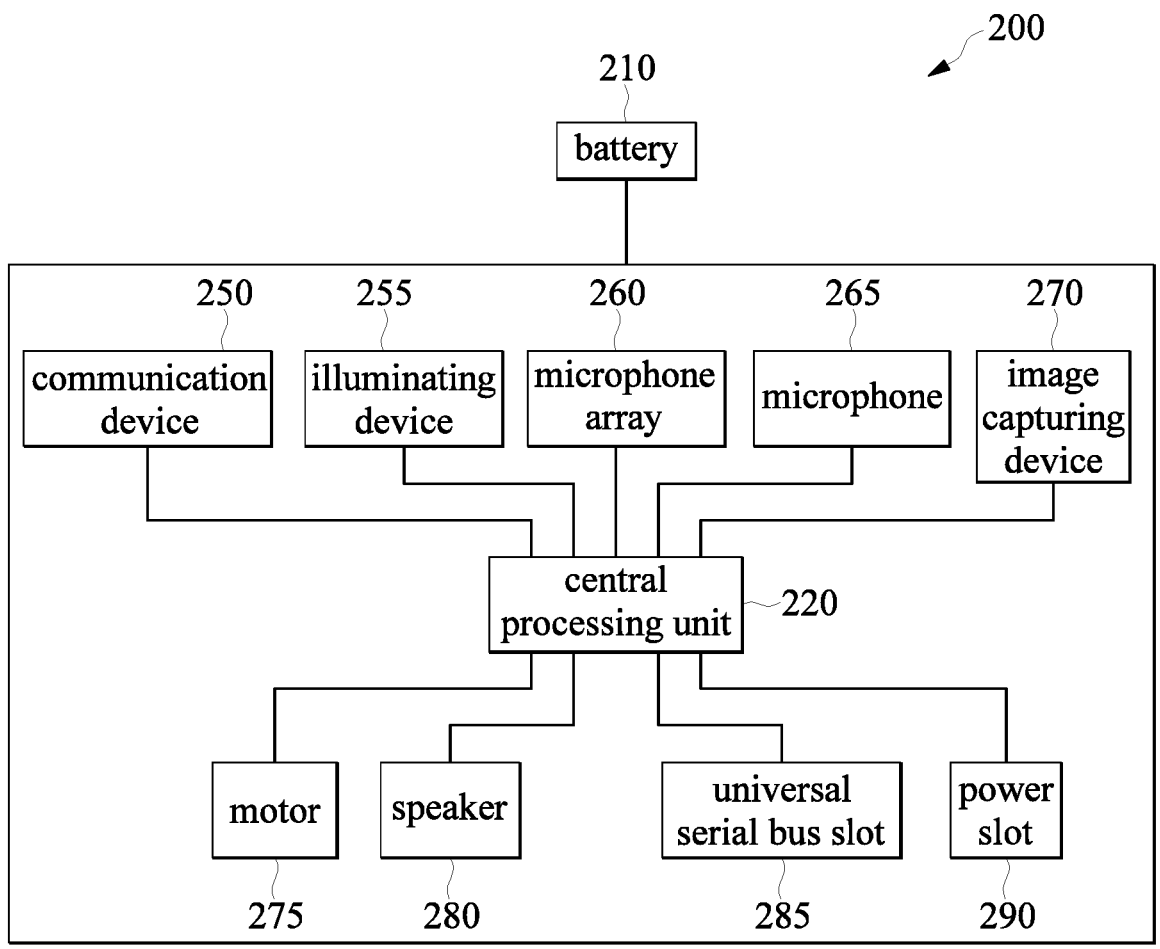
FIG. 2 shows a block diagram of the power saving system for an intelligent robot according to another embodiment of the instant disclosure.

Reference is made to FIGS. 1 and 2. FIG. 2 shows a block diagram of the power saving system for an intelligent robot according to another embodiment of the instant disclosure. The power saving system 2 includes an intelligent robot 200.

The intelligent robot 200 includes a battery 210, a central processing unit 220, a communication device 250, an illuminating device 255, a microphone array 260, a microphone 265, an image capturing device 270, a motor 275 and a speaker 280. The central processing unit 220 is electrically connected to the communication device 250, the illuminating device 255, the microphone array 260, the microphone 265, the image capturing device 270, the motor 275 and the speaker 280. The battery 210 is configured to provide electrical energy to the central processing unit 220, the communication device 250, the illuminating device 255, the microphone array 260, the microphone 265, the image capturing device 270, the motor 275 and the speaker 280.

The first device group 130 and the second device group 140 include a plurality of electronic devices. The plurality of electronic devices at least includes the communication device 250, the illuminating device 255, the microphone array 260, the microphone 265, the image capturing device 270, the motor 275 and the speaker 280. The electronic devices of the first device group 130 are different from the electronic devices of the second device group 140. The operating voltages of the first device group 130 are higher than the operating voltages of the second device group 140. In other words, the first device group 130 may include the communication device 250, the illuminating device 255, the microphone array 260, the microphone 265, the image capturing device 270, the motor 275, the speaker 280 and a combination thereof. The second device group 140 may include the communication device 250, the illuminating device 255, the microphone array 260, the microphone 265, the image capturing device 270, the motor 275, speaker 280 and a combination thereof. For example, if the operating voltage of the image capturing device 270 and the motor 275 is 15.4 V, when the operating voltage of the battery 210 decreases from 16.8 V to 15.4 V, the central processing unit 210 controls the image capturing device 270 and the motor 275 to stop receiving energy from the battery 210. At this time, the first device group 130 includes the image capturing device 270 and the motor 275. If the operating voltage of the microphone 265 and the speaker 280 is 14.2 V, when the operating voltage of the battery 210 decreases from 15.4 V to 14.2 V, the central processing unit 210 controls the microphone 265 and the speaker 280 to stop receiving energy from the battery 210. At this time, the second device group 140 includes the microphone 265 and the speaker 280. When the operating voltage of the battery 210 decreases from 14.2 V to 12.0V, the central processing unit 220 controls the illuminating device 255 and the microphone array 260 to stop receiving energy from the battery 210. Since the illuminating device 255 and the microphone array 260 have lower power consumption, the central processing unit 220 controls the majority of electronic components of the intelligent robot 200 to stop receiving energy from the battery 210 when the illuminating device 255 and the microphone array 260 stop receiving electrical energy.

The intelligent robot 200 includes a communication device 250 that is electrically connected to the central processing unit 220. When the central processing unit 220 controls the first device group 130 to stop receiving energy from the battery 210, the communication device 250 transmits a first shutdown signal to a mobile device (not shown). For example, the mobile device may be a smartphone, a tablet or a laptop. When a user receives the first shutdown signal through the mobile device, it indicates that the voltage level of the battery 210 is changed to the second voltage level from the first voltage level. When the central processing unit 220 controls the second device group 140 to stop receiving energy from the battery 210, the communication device 250 transmits a second shutdown signal to the mobile device, which indicates that the voltage level of the battery 210 is changed to the third voltage level from the second voltage level. When the central processing unit 220 controls the majority of electronic components of the intelligent robot 200 to stop receiving energy from the battery 210, the communication device 250 transmits a third shutdown signal to the mobile device, which indicates that the voltage level of the battery 210 is changed to a voltage threshold value from the third voltage level. More specifically, the communication device 250 has higher priority in receiving electrical energy from the battery 210 for maintaining the communication stability of the intelligent robot 200. The battery 210 may increase the supplied voltage through a voltage converter (not shown) and transmit the increased voltage to the communication device 250 for enhancing the communication quality of the intelligent robot 200.

The intelligent robot 200 includes a universal serial bus slot 285 and a power slot 290 that are electrically connected to the central processing unit 220. When the universal serial bus slot 285 and/or the power slot 290 connect to an electronic device, the central processing unit 220 controls the motor 270 to stop receiving energy from the battery 210. For example, the universal serial bus slot 285 may connect to and charge the smartphone, and the power slot 290 may connect to a domestic power source. In other words, when the central processing unit 220 determines that the intelligent robot 200 is charging or discharging, the central processing unit 220 turns off the motor 275 and prevents the intelligent robot 200 from moving or turning for maintaining electrical safety. In addition, when the universal serial bus slot 285 and the power slot 290 are not connected with an electronic device, the central processing unit 220 controls the motor 275 to receive energy from the battery 210. In addition, the intelligent robot 200 moves or turns when the communication device 250 receives a turning command or a moving command from the mobile device.

When the speaker 280 is in an idle state for over a first predetermined time period, the central processing unit 220 controls the speaker 280 to stop receiving energy from the battery 210. For example, when the speaker 280 is in the idle state for over three minutes, the central processing unit 220 may turn off the speaker 280 for saving power. When the microphone 265 receives an activating command to activate the speaker 280, the central processing unit 220 controls the speaker 280 to receive energy from the battery 210. For example, when the user says "turn on the weather forecast", the central processing unit 220 may activate the speaker 280 for weather forecasting.

When the universal serial bus slot 285 and/or power slot 290 connect to the electronic device, the illuminating device 255 emits a light lasting for a second predetermined time period. For example, when the universal serial bus slot 285 connects to the tablet and/or the power slot 290 connects to the domestic power source, the illuminating device 255 may emit the light lasting for ten-seconds. When the microphone 265 receives a power confirming command to confirm remaining power, the speaker 280 can emit a voice informing a user of the remaining power, and the illuminating device 255 can emit the light lasting for the second predetermined time period. For example, when the user says "confirm power" and the speech command is received by the microphone 265, the speaker 280 may emit the remaining power and the illuminating device 255 may emit the light lasting for ten-seconds.

When the microphone 265 receives an activating command, the central processing unit 220 can activate the microphone array 260 and the image capturing device 270. For example, when the user says "turn on microphone and image capturing device", the central processing unit 220 activates the microphone 260 and the image capturing device 270. The microphone array 260 is configured to eliminate noise for enhancing sound quality. The image capturing device 270 is configured to capture human images and scenery images. When the microphone 265 is in the idle state for over a third predetermined time period, the central processing unit 220 can turn off the microphone array 260 and the image capturing device 270.

Figure 3A:
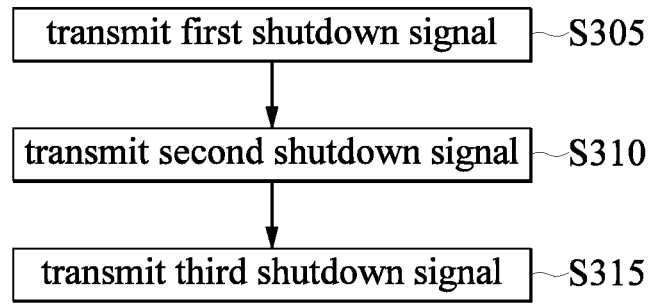
FIG. 3A shows a flow chart of a power saving method for an intelligent robot according to one embodiment of the instant disclosure.

Reference is made to FIGS. 1, 2 and 3A. FIG. 3A shows a flow chart of a power saving method for an intelligent robot according to one embodiment of the instant disclosure. The intelligent robot 100 includes a battery 110, a central processing unit 120, a first device group 130 and a second device group 140. The central processing unit 120 is electrically connected to the battery 110, the first device group 130 and the second device group 140. The battery 110 charges the intelligent robot 100 at a first voltage level.

In Step S305 of the power saving method, when a voltage level of the battery 110 is changed to a second voltage level from the first voltage level, the central processing unit 120 controls the first device group 130 to stop receiving energy from the battery 110, and the communication device 250 transmits a first shutdown signal to a mobile device, the first voltage level being higher than the second voltage level.

In Step S310 of the power saving method, when the voltage level of the battery 110 is changed to a third voltage level from the second voltage level, the central processing unit 120 controls the second device group 140 to stop receiving energy from the battery 110, and the communication device 250 transmits a second shutdown signal to the mobile device, the second voltage level being higher than the third voltage level.

In Step S315 of the power saving method, when the voltage level of the battery 110 is changed to a voltage threshold value from the third voltage level, the central processing unit 120 controls the majority of electronic devices of the intelligent robot 100 to stop receiving energy from the battery, and the communication device 250 transmits a third shutdown signal to the mobile device.

Figure 3B:
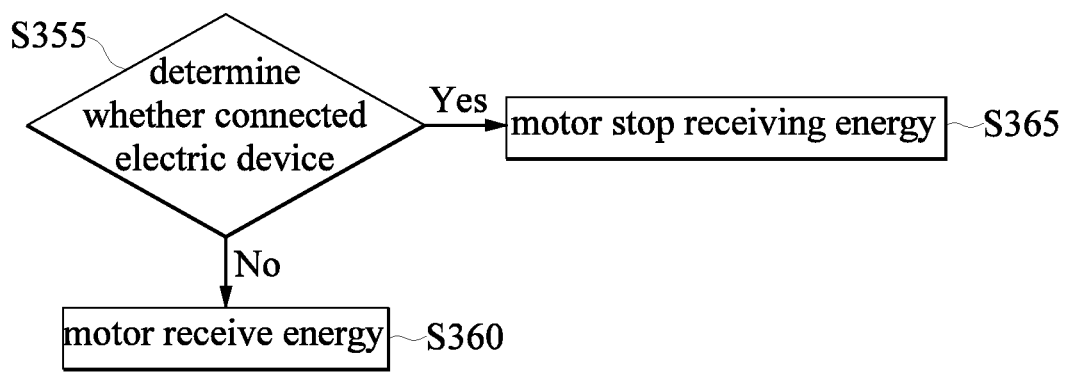
FIG. 3B shows a flow chart illustrating a motor in the power saving method for an intelligent robot according to one embodiment of the instant disclosure.

Reference is made to FIGS. 2 and 3B. FIG. 3B shows a flow chart illustrating a motor in the power saving method for an intelligent robot according to one embodiment of the instant disclosure.

In Step S355 of the power saving method, the central processing unit 220 determines whether a universal serial bus slot 285 and/or a power slot 290 is connected with an electronic device. If yes, the method proceeds to Step S365; but if not, the method proceeds to Step S360.

In Step S360, when the universal serial bus slot 285 and the power slot 290 are not connected with an electronic device, the central processing unit 220 controls a motor 275 to receive energy from the battery 210.

In Step S365, when the universal serial bus slot 285 and/or the power slot 290 is connected with the electronic device, the central processing unit 220 controls the motor 275 to stop receiving energy from the battery 210.

Figure 4:
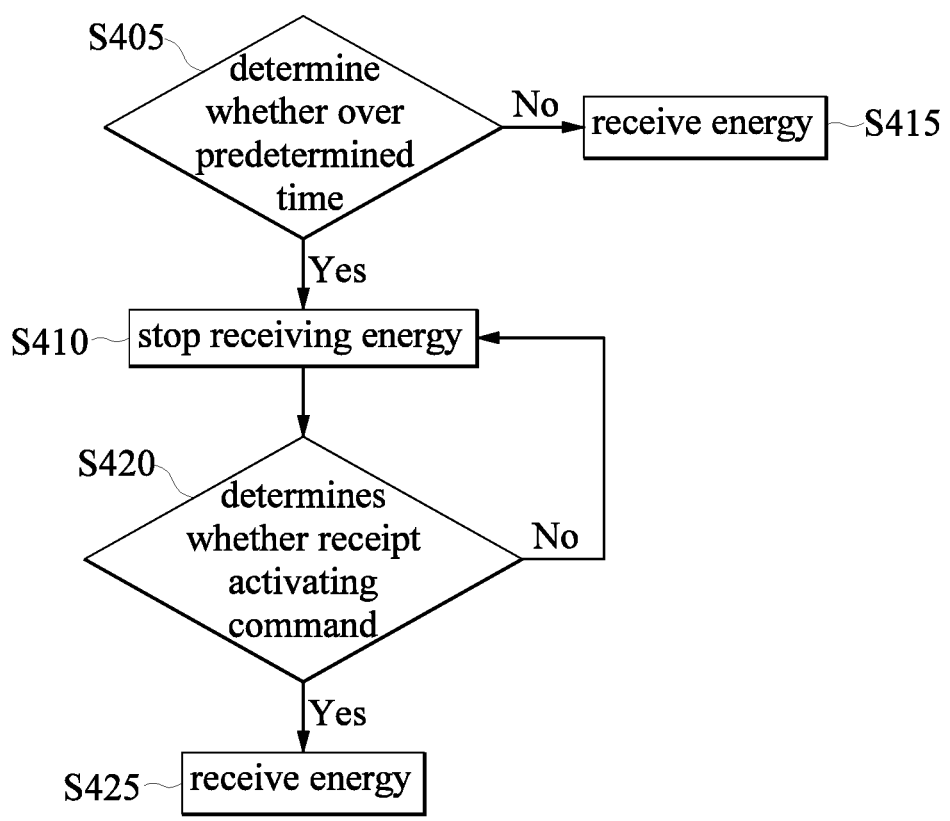
FIG. 4 shows a flow chart illustrating a speaker in the power saving method for an intelligent robot according to one embodiment of the instant disclosure.

Reference is made to FIGS. 2 and 4. FIG. 4 shows a flow chart illustrating a speaker in the power saving method for an intelligent robot according to one embodiment of the instant disclosure.

In Step S405, the central processing unit 220 determines whether a speaker 280 is in an idle state for over a first predetermined time period. If yes, the method proceeds to Step S410; but if not, the method proceeds to Step S415.

In Step S410, the central processing unit 220 controls the speaker 280 to stop receiving energy from the battery 210.

In Step S415, the central processing unit 220 controls the speaker 280 to receive energy from the battery 210.

In Step S420, the central processing unit 220 determines whether a microphone 265 is in receipt of an activating command. If yes, the method proceeds to Step S425; but if not, the method proceeds to Step S410.

In Step S425, the central processing unit 220 controls the speaker 280 to receive energy from the battery 210.

Figure 5:
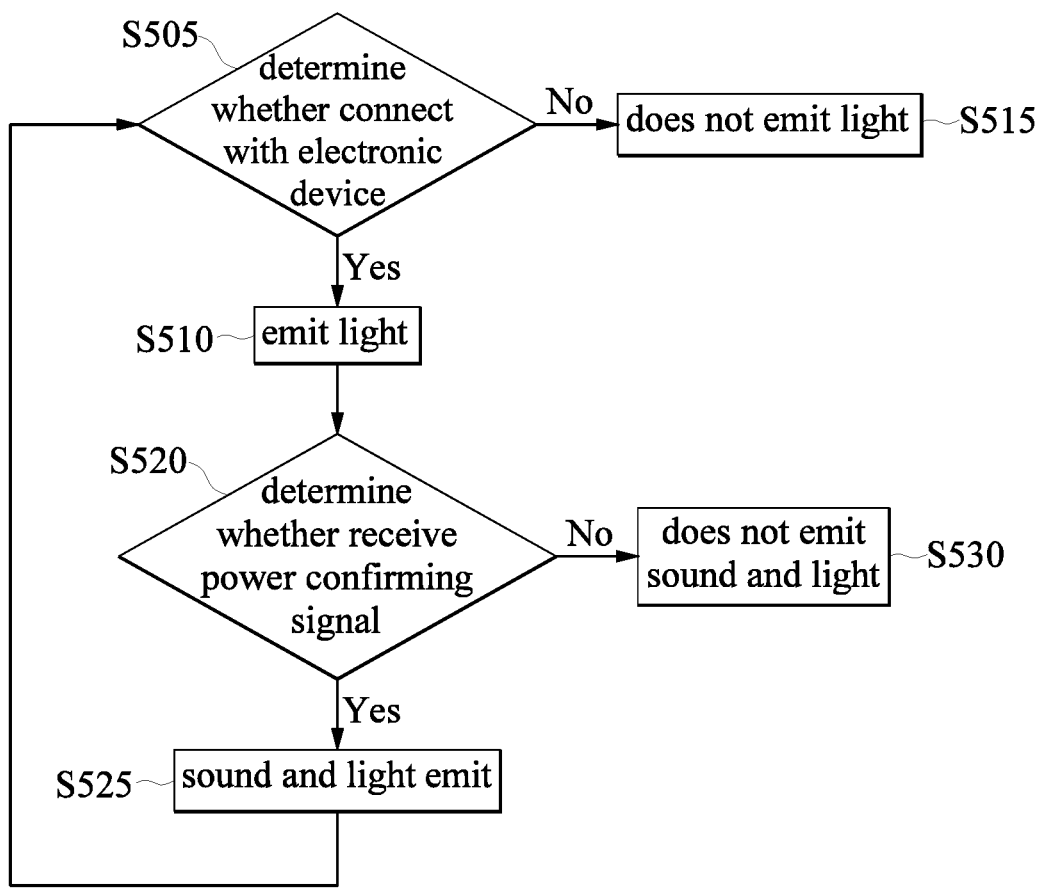
FIG. 5 shows a flow chart illustrating an illuminating device in the power saving method for an intelligent robot according to one embodiment of the instant disclosure.

Reference is made to FIGS. 2 and 5. FIG. 5 shows a flow chart illustrating an illuminating device in the power saving method for an intelligent robot according to one embodiment of the instant disclosure.

In Step S505, the central processing unit 220 determines whether universal serial bus slot 285 or power slot 290 is connected with an electronic device. If yes, the method proceeds to Step S510; but if not, the method proceeds to Step S515.

In Step S510, when the universal serial bus slot 285 and/or power slot 290 is connected with an electronic device, an illuminating device 255 emits a light lasting for a second predetermined time period.

In Step S515, when the universal serial bus slot 285 and power slot 290 are not connected with an electronic device, the illuminating device 255 does not emit the light.

In Step S520, the central processing unit 220 determines whether a microphone 265 receives a power confirming signal. If yes, the method proceeds to Step S525; but if not, the method proceeds to Step S530.

In Step S525, a speaker 280 emits a remaining power sound that informs a user of the remaining power, the illuminating device 255 emits the light lasting for the second predetermined time period, and the method returns to Step S505.

In Step S530, the speaker 280 does not emit the remaining power sound, and the illuminating device 255 does not emit the light.

Figure 6:
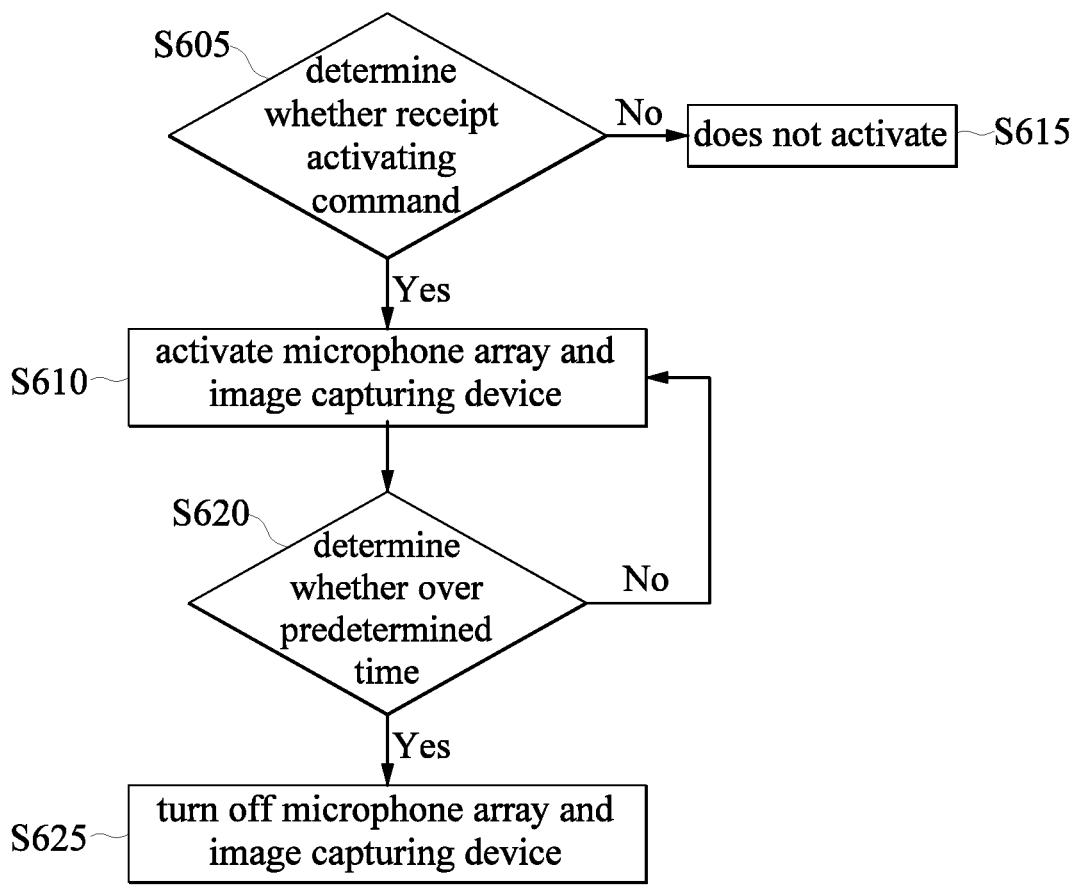
FIG. 6 shows a flow chart illustrating a microphone array and an image capturing device in the power saving method for an intelligent robot according to one embodiment of the instant disclosure.

Reference is made to FIGS. 2 and 6. FIG. 6 shows a flow chart illustrating a microphone array and an image capturing device in the power saving method for an intelligent robot according to one embodiment of the instant disclosure.

In Step S605, the central processing unit 220 determines whether the microphone 265 is in receipt of an activating command. If yes, the method proceeds to Step S610; but if not, the method proceeds to Step S615.

In Step S610, the central processing unit 220 activates the microphone array 260 and the image capturing device 270.

In Step S615, the central processing unit 220 does not activate the microphone array 260 and the image capturing device 270.

In Step S620, the central processing unit 220 determines whether the microphone 265 is in an idle state for over a third predetermined time period. If yes, the method proceeds to Step S625; but if not, the method proceeds to Step S610.

In Step S625, the central processing unit 220 turns off the microphone array 260 and image capturing device 270 for saving power.

To sum up, the instant disclosure provides a power saving system and a power saving method for an intelligent robot. A battery charges the intelligent robot at a first voltage level. When a voltage level of the battery decreases from the first voltage level to a second voltage level, a central processing unit turns off the first device group. When the voltage level of the battery decrease from the second voltage level to a third voltage level, the central processing unit turn off the second device group. The central processing unit decreases the power consumption of the intelligent robot respectively and sequentially in accordance with the voltage level of a specific device group. The central processing unit turns off the motor when a slot is connected with an electronic device for the power safety. When a microphone and a speaker are in an idle state for over predetermined time period, the battery stops providing electrical energy for saving power. When the microphone receives a voice command, the central processing unit turns on the microphone array and the image capturing device to improve human-robot interaction.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A power saving system for an intelligent robot includes a battery that charges the intelligent robot at a first voltage level, the power saving system comprising:
    a central processing unit;
    a first device group electrically connected to the central processing unit, when a voltage level of the battery is changed to a second voltage level from the first voltage level, the central processing unit controls the first device group to stop receiving energy from the battery, the first voltage level being higher than the second voltage level;
    a second device group electrically connected to the central processing unit, when the voltage level of the battery is changed to a third voltage level from the second voltage level, the central processing unit controls the second device group to stop receiving energy from the battery, the second voltage level being higher than the third voltage level; and
    wherein when the voltage level of the battery is changed to a voltage threshold value from the third voltage level, the central processing unit controls the intelligent robot to stop receiving energy from the battery.

2. The power saving system according to claim 1, wherein the intelligent robot includes a communication device electrically connected to the central processing unit, when the central processing unit controls the first device group to stop receiving energy from the battery, the communication device transmits a first shutdown signal to a mobile device, when the central processing unit controls the second device group to stop receiving energy from the battery, the communication device transmits a second shutdown signal to the mobile device, when the central processing unit controls the intelligent robot to stop receiving energy from the battery, the communication device transmits a third shutdown signal to the mobile device.

3. The power saving system according to claim 1, wherein the first device group includes at least one of a plurality of electronic devices and the second device group includes at least another one of the plurality of electronic devices, the plurality of electronic device at least includes an illuminating device, a microphone array, a microphone, an image capturing device, a motor and a speaker that are electrically connected to the central processing unit, the electronic devices of the first device group device being different from the electronic devices of the second device group, wherein operating voltages of electronic devices of the first device group are higher than operating voltages of electronic devices of the second device group.

4. The power saving system according to claim 3, wherein the intelligent robot includes a universal serial bus slot and a power slot electrically connected to the central processing unit, when the universal serial bus slot and/or the power slot are connected with an electronic device, the central processing unit controls the motor to stop receiving energy from the battery, when the universal serial bus slot and the power slot are not connected with the electronic device, the central processing unit controls the motor to receive energy from the battery.

5. The power saving system according to claim 3, wherein when the speaker is in an idle state for over a first predetermined time period, the central processing unit controls the speaker to stop receiving energy from the battery, when the microphone receives an activating command, the central processing unit controls the speaker to receive energy from the battery.

6. The power saving system according to claim 4, wherein when the universal serial bus slot and/or power slot are connected with the electronic device, the illuminating device emits a light lasting for a second predetermined time period, when the microphone receives a power confirming command, the speaker emits a remaining power sound and the illuminating device emits the light lasting for the second predetermined time period.

7. The power saving system according to claim 3, wherein when the microphone receives an activating command, the central processing unit activates the microphone array and the image capturing device, when the microphone is in an idle state for over a third predetermined time period, the central processing unit turns off the microphone array and the image capturing device.

8. A power saving method for an intelligent robot, the intelligent robot including a battery, a central processing unit, a first device group and a second device group, the central processing unit being electrically connected to the battery, the first device group and the second device group, the battery charging the intelligent robot at a first voltage level, the power saving method comprising:
    controlling the first device group to stop receiving energy from the battery when a voltage level of the battery is changed to a second voltage level from the first voltage level, the first voltage level being higher than the second voltage level;
    controlling the second device group to stop receiving energy from the battery when the voltage level of the battery is changed to a third voltage level from the second voltage level, the second voltage level being higher than the third voltage level; and
    wherein when the voltage level of the battery is changed to a voltage threshold value from the third voltage level, the central processing unit controls the intelligent robot to stop receiving energy from the battery.

9. The power saving method according to claim 8, the intelligent robot including a communication device electrically connected to the central processing unit, the power saving method further comprising:
    when the central processing unit controls the first device group to stop receiving energy from the battery, the communication device transmits a first shutdown signal to a mobile device, when the central processing unit controls the second device group to stop receiving energy from the battery, the communication device transmits a second shutdown signal to the mobile device, when the central processing unit controls the intelligent robot to stop receiving energy from the battery, the communication device transmits a third shutdown signal to the mobile device.

10. The power saving method according to claim 8, wherein the first device group includes at least one of a plurality of electronic devices and the second device group includes at least another one of the plurality of electronic devices, the plurality of electronic devices at least includes an illuminating device, a microphone array, a microphone, an image capturing device, a motor and a speaker that are electrically connected to the central processing unit, the electronic devices of the first device group device are different from the electronic devices of the second device group, wherein operating voltages of electronic devices of the first device group are higher than operating voltages of electronic devices of the second device group.

11. The power saving method according to claim 10, wherein the intelligent robot includes a universal serial bus slot and a power slot electrically connected to the central processing unit, the power saving method further comprising:
when the universal serial bus slot and/or the power slot are connected with an electronic device, the central processing unit controls the motor to stop receiving energy from the battery, when the universal serial bus slot and the power slot are not connected with the electronic device, the central processing unit controls the motor to receive energy from the battery.

12. The power saving method according to claim 10, further comprising:
wherein when the speaker is in an idle state for over a first predetermined time period, the central processing unit controls the speaker to stop receiving energy from the battery, when the microphone receives an activating command, the central processing unit controls the speaker to receive energy from the battery.

13. The power saving method according to claim 11, further comprising:
wherein when the universal serial bus slot and/or power slot are connected with the electronic device, the illuminating device emits a light lasting for a second predetermined time period, when the microphone receives a power confirming command, the speaker emits a remaining power sound and the illuminating device emits the light lasting for the second predetermined time period.

14. The power saving method according to claim 10, further comprising:
wherein when the microphone receives an activating command, the central processing unit activates the microphone array and the image capturing device, when the microphone is in an idle state for over a third predetermined time period, the central processing unit turns off the microphone array and the image capturing device.

* * * * *